United States Patent
Sano et al.

(10) Patent No.: US 10,230,108 B2
(45) Date of Patent: Mar. 12, 2019

(54) ACTIVE MATERIAL, METHOD FOR MANUFACTURING ACTIVE MATERIAL, ELECTRODE, AND LITHIUM ION SECONDARY BATTERY

(75) Inventors: Atsushi Sano, Tokyo (JP); Keitaro Otsuki, Tokyo (JP); Tomohiko Kato, Tokyo (JP); Akiji Higuchi, Kyoto (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/005,368

(22) PCT Filed: Mar. 30, 2012

(86) PCT No.: PCT/JP2012/058507
§ 371 (c)(1),
(2), (4) Date: Sep. 16, 2013

(87) PCT Pub. No.: WO2012/133730
PCT Pub. Date: Oct. 4, 2012

(65) Prior Publication Data
US 2014/0004417 A1    Jan. 2, 2014

(30) Foreign Application Priority Data
Mar. 31, 2011   (JP) ................ 2011-078726

(51) Int. Cl.
*H01M 4/58*     (2010.01)
*C01B 25/45*    (2006.01)
(Continued)

(52) U.S. Cl.
CPC .......... *H01M 4/5825* (2013.01); *C01B 25/45* (2013.01); *H01M 4/136* (2013.01); *H01M 10/0525* (2013.01)

(58) Field of Classification Search
CPC ........................................... H01M 4/58
See application file for complete search history.

(56) References Cited

U.S. PATENT DOCUMENTS

| | | | |
|---|---|---|---|
| 2007/0141468 A1* | 6/2007 | Barker ............... | H01M 4/364 429/231.1 |
| 2008/0241043 A1* | 10/2008 | Barker ............... | C01B 25/455 423/301 |

(Continued)

FOREIGN PATENT DOCUMENTS

| | | |
|---|---|---|
| EP | 1986254 A2 * | 10/2008 |
| JP | A-2003-68304 | 3/2003 |

(Continued)

OTHER PUBLICATIONS

Lii et al., "Hydrothermal Synthesis, Structure, and Magnetic Properties of a New Polymorph of Lithium Vanadyl(IV) Orthophosphate: β-LiVOPO$_4$," *Journal of Solid State Chemistry*, 1991, pp. 352-359, vol. 95, Academic Press, Inc.

(Continued)

*Primary Examiner* — Barbara L Gilliam
*Assistant Examiner* — Nathanael T Zemui
(74) *Attorney, Agent, or Firm* — Oliff PLC

(57) ABSTRACT

An active material capable of improving the discharge capacity of a lithium ion secondary battery is provided. The active material of the present invention includes LiVOPO$_4$ and one or more metal elements selected from the group consisting of Al, Nb, Ag, Mg, Mn, Fe, Zr, Na, K, B, Cr, Co, Ni, Cu, Zn, Si, Be, Ti, and Mo.

17 Claims, 1 Drawing Sheet

(51) Int. Cl.
  *H01M 4/136* (2010.01)
  *H01M 10/0525* (2010.01)

(56) References Cited

U.S. PATENT DOCUMENTS

| | | | |
|---|---|---|---|
| 2008/0261113 A1 | 10/2008 | Huang et al. | |
| 2008/0268339 A1* | 10/2008 | Suzuki | H01M 4/131 429/220 |
| 2009/0008244 A1* | 1/2009 | Suzuki | H01M 4/366 204/290.12 |
| 2009/0017384 A1* | 1/2009 | Iwasaki | H01M 4/04 429/231.95 |
| 2010/0227221 A1* | 9/2010 | Chang | H01M 4/485 429/231.95 |
| 2010/0233545 A1 | 9/2010 | Sano et al. | |

FOREIGN PATENT DOCUMENTS

| | | |
|---|---|---|
| JP | A-2004-303527 | 10/2004 |
| JP | 2008-277120 A | 11/2008 |
| JP | 2008-277152 A | 11/2008 |
| JP | A-2010-510631 | 4/2010 |
| JP | A-2010-218822 | 9/2010 |
| JP | A-2010-218830 | 9/2010 |
| WO | WO 2008061174 A2 * | 5/2008 |

OTHER PUBLICATIONS

Dupre et al., "Positive electrode materials for lithium batteries based on $VOPO_4$," *Solid State Ionics*, 2001, pp. 209-221, vol. 140, Elsevier Science B.V.

Dupre et al., "Electrochemical performance of different Li-$VOPO_4$ systems," *Journal of Power Sources*, 2001, pp. 532-534, vols. 97-98, Elsevier Science B.V.

Barker et al., "Electrochemical Properties of Beta-Li$VOPO_4$ Prepared by Carbothermal Reduction," *Journal of The Electrochemical Society*, 2004, pp. A796-A800, vol. 151, No. 6, The Electrochemical Society.

Azmi et al., "Cathodic Performance of Li$VOPO_4$ Prepared by Impregnation Method for Li Ion Secondary Battery," *Electrochemistry*, 2003, pp. 1108-1110, vol. 71, No. 12.

International Search Report issued in International Patent Application No. PCT/JP2012/058507 dated May 1, 2012.

International Preliminary Report on Patentability issued in International Patent Application No. PCT/JP2012/058507 dated Oct. 1, 2013 (w/translation).

* cited by examiner

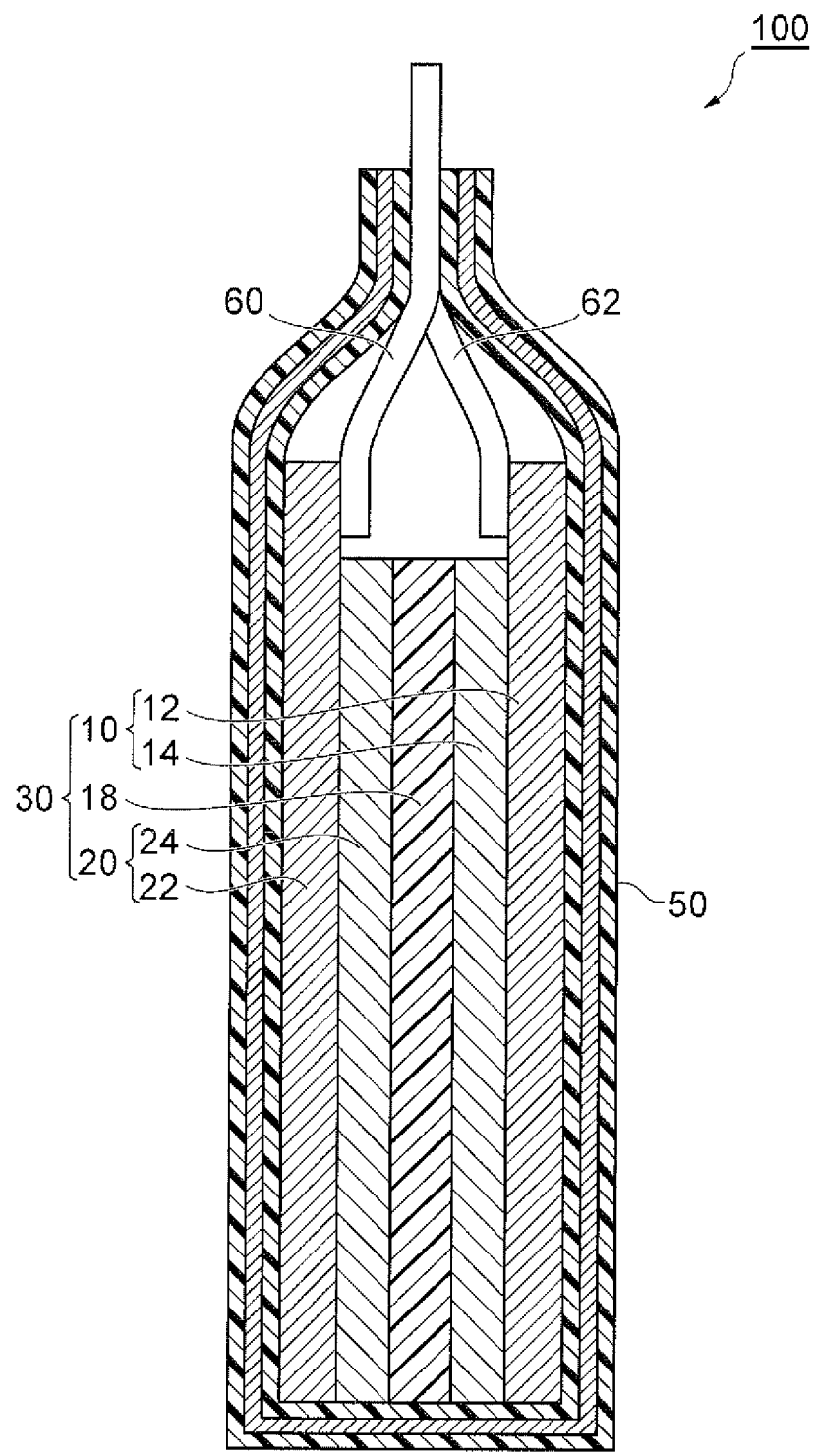

ACTIVE MATERIAL, METHOD FOR MANUFACTURING ACTIVE MATERIAL, ELECTRODE, AND LITHIUM ION SECONDARY BATTERY

TECHNICAL FIELD

The present invention relates to an active material, a method for manufacturing an active material, an electrode, and a lithium ion secondary battery.

BACKGROUND ART

A layered compound such as $LiCoO_2$ or $LiNi_{1/3}Mn_{1/3}CO_{1/3}O_2$ or a spinel compound such as $LiMn_2O_4$ has conventionally been used as a positive electrode material (positive electrode active material) for a lithium ion secondary battery. In recent years, a compound with an olivine type structure typified by $LiFePO_4$ has attracted attention. It is known that the positive electrode material having the olivine structure is highly safe because of having high thermal stability at high temperature. A lithium ion secondary battery with $LiFePO_4$, however, has a drawback of having a discharging/discharging voltage as low as 3.5 V and low energy density. In view of this, $LiCoPO_4$, $LiNiPO_4$, and the like have been suggested as a phosphate-based positive electrode material that can achieve high charging/discharging voltage. However, at present, a lithium ion secondary battery with such a positive electrode material has not yet achieved sufficient capacity. Among the phosphate-based positive electrode materials, $LiVOPO_4$ has been known as a compound that can achieve a charging/discharging voltage as high as 4 V. In such a lithium ion secondary battery with $LiVOPO_4$, however, sufficient reversible capacity and rate characteristic have not yet been obtained. The positive electrode material as above is disclosed in Patent Documents 1 and 2 and Non-Patent Documents 1 to 5 below. The lithium ion secondary battery may be referred to as "battery" in this specification.

CITATION LIST

Patent Documents

Patent Document 1: JP-A-2003-68304
Patent Document 2: JP-A-2004-3035271

Non-Patent Documents

Non-Patent Document 1: J. Solid State Chem., 95, 352 (1991)
Non-Patent Document 2: N. Dupre et al., Solid State Tonics, 140, pp. 209-221 (2001)
Non-Patent Document 3: N. Dupre et al., J. Power Sources, 97-98, pp. 532-534 (2001)
Non-Patent Document 4: J. Baker et al. J. Electrochem. Soc., 151, A796 (2004)
Non-Patent Document 5: Electrochemistry, 71, 1108 (2003)

DISCLOSURE OF THE INVENTION

Problems to be Solved by the Invention

The present invention has been made in view of the above problem of the conventional art, and an object of the present invention is to provide an active material capable of improving the discharge capacity of a lithium ion secondary battery, a method for manufacturing the active material, and an electrode and a lithium ion secondary battery including the active material.

Solutions to the Problems

In order to achieve the above object, an active material according to the present invention includes $LiVOPO_4$ and one or more kinds of metal elements selected from the group consisting of Al, Nb, Ag, Mg, Mn, Fe, Zr, Na, K, B, Cr, Co, Ni, Cu, Zn, Si, Be, Ti, and Mo.

An electrode according to the present invention includes a current collector and an active material layer stacked on the current collector, and the active material layer contains the active material according to the present invention and a conductive auxiliary agent.

A lithium ion secondary battery according to the present invention includes the electrode according to the present invention.

According to the present invention, the discharge capacity can be improved as compared with a lithium ion secondary battery with the conventional active material ($LiVOPO_4$) not containing the above metal element.

A method for manufacturing the active material according to the present invention includes a hydrothermal synthesis step of heating a mixture including one or more kinds of metal elements selected from the group consisting of Al, Nb, Ag, Mg, Mn, Fe, Zr, Na, K, B, Cr, Co, Ni, Cu, Zn, Si, Be, Ti, and Mo, a lithium source, a phosphate source, a vanadium source, and water under pressure.

According to the manufacturing method of the present invention, the active material of the present invention can be provided.

Effects of the Invention

According to the present invention, the method for manufacturing the active material capable of improving the discharge capacity of the lithium ion secondary battery can be provided.

BRIEF DESCRIPTION OF THE DRAWINGS

FIG. 1 is a schematic sectional view of a lithium ion secondary battery according to an embodiment of the present invention.

DESCRIPTION OF PREFERRED EMBODIMENT (Active Material)

An active material according to an embodiment of the present invention is hereinafter described. The active material according to this embodiment includes $LiVOPO_4$ and one or more kinds of metal elements selected from the group consisting of Al, Nb, Ag, Mg, Mn, Fe, Zr, Na, K, B, Cr, Co, Ni, Cu, Zn, Si, Be, Ti, and Mo. In the active material, the $LiVOPO_4$ crystal may be doped with a very small amount of metal element. In the active material, the metal element may be present as a metal salt or a metal oxide. The metal salt or metal oxide may be separated out on a surface of the $LiVOPO_4$ crystal. In other words, the metal salt or the metal oxide may be composited with the $LiVOPO_4$ in the scale of crystal. The metal salt or the metal oxide may be formed of two or more kinds of the above metal elements.

By doping with the metal element, the lattice constant of $LiVOPO_4$ is changed. By particularly enlarging the opening area of a diffusion path of lithium ions in the b-axis direction, the diffusion speed of the lithium ions increases. In other words, since the block of the diffusion path for the lithium ions in $LiVOPO_4$ is suppressed, the diffusion capability or the intercalation and deintercalation capability for the lithium ions is improved. Moreover, due to the co-existence of the plurality of metal elements with different valence in $LiVOPO_4$, the valence of vanadium becomes substantially the mixed valence; thus, the electron conductivity of $LiVOPO_4$ is improved. Moreover, the conductivity of the entire active material is improved due to the addition of the metal element. For these reasons, the discharge capacity at high rate is improved as compared with that of the battery with the active material lacking $LiVOPO_4$ or any of the metal elements. However, the advantageous effect of this embodiment is not limited to the above matter.

Specific examples of the metal salt include a hydroxide, a carbonate, a sulfate, a chloride, a phosphide, or the like of the metal salt, such as $Al(OH)_3$, $AlCl_3$, $Al(CH_3COO)_3$, $AlP$, $Mg(OH)_2$, $MgCl_2$, $MgCO_3$, $Mg_3P_2$, $NaOH$, $KOH$, $FeSO_4$, $Fe(OH)_2$, $FeCl_2$, $Fe_2P$, or $ZrCl_4$. Specific examples of the metal oxide include $Al_2O_3$, $Nb_2O_5$, $Ag_2O$, $MgO$, $MnO_2$, $Fe_2O_3$, $ZrO_2$, $Cr_2O_3$, $Co_2O_3$, $NiO_2$, $CuO$, $SnO_2$, $SiO_2$, $BeO$, $TiO_2$, and $MoO_2$.

The primary particle of the active material has a mean particle diameter of, preferably, 1000 nm or less. As the primary particle becomes smaller, the specific surface area thereof increases to enhance the intercalation and deintercalation capability for the lithium ions. Further, the filling ratio of the active material in the active material layer tends to increase, thereby increasing the capacity density of the battery. Note that the primary particle may be the crystal particle of $LiVOPO_4$ doped with the metal element, or may be a composite particle of the metal salt or the metal oxide and the $LiVOPO_4$ crystal.

(Method for Manufacturing Active Material)

A method for manufacturing the active material according to an embodiment of the present invention is hereinafter described.

<Hydrothermal Synthesis Step>

In the hydrothermal synthesis step, first, the aforementioned lithium source, phosphate source, vanadium source, water, and metal element are input into a reaction container (for example, an autoclave) having a function of heating and pressurizing the inside, so that a mixture (aqueous solution) having these dispersed is prepared.

In the preparation of the mixture, for example, a mixture of the phosphate source, the vanadium source, and water may be refluxed first and then the lithium source may be added thereto. Through this reflux, a composite of the phosphate source and the vanadium source can be formed. Alternatively, after preparing a mixture of the lithium source, the phosphate source, the vanadium source, and water in advance, the metal element may be added to the mixture. A reducing agent may be added to the mixture. Thus, the pentavalent vanadium in the mixture is reduced to easily generate tetravalent vanadium that constitutes a part of $LiVOPO_4$.

As the metal element contained in the mixture, one or more kinds of metal elements selected from the group consisting of Al, Nb, Ag, Mg, Mn, Fe, Zr, Na, K, B, Cr, Co, Ni, Cu, Zn, Si, Be, Ti, and Mo may be used. Any of these elements may be referred to as the metal element M below. The metal element may be a single metal element (metal particle). The metal element may be a compound such as a metal salt or a metal oxide. Specific examples of the metal salt include $Al(OH)_3$, $AlCl_3$, $Al(CH_3COO)_3$, $AlP$, $Mg(OH)_2$, $MgCl_2$, $MgCO_3$, $Mg_3P_2$, $NaOH$, $KOH$, $FeSO_4$, $Fe(OH)_2$, $FeCl_2$, $Fe_2P$, and $ZrCl_4$. Specific examples of the metal oxide include $Al_2O_3$, $Nb_2O_5$, $Ag_2O$, $MgO$, $MnO_2$, $Fe_2O_3$, $ZrO_2$, $Cr_2O_3$, $Co_2O_3$, $NiO_2$, $CuO$, $SnO_2$, $SiO_2$, $BeO$, $TiO_2$, and $MoO_2$. The two or more kinds of the metal salts or the metal oxides may be contained in the mixture.

As the lithium source, at least one kind selected from the group consisting of $LiNO_3$, $Li_2CO_3$, $LiOH$, $LiCl$, $Li_2SO_4$, $Li_3PO_4$, and $CH_3COOLi$ can be used.

As the phosphate source, at least one kind selected from the group consisting of $H_3PO_4$, $NH_4H_2PO_4$, $(NH_4)_2HPO_4$ and $Li_3PO_4$ can be used.

As the vanadium source, at least one kind selected from the group consisting of $V_2O_5$ and $NH_4VO_3$ can be used.

Note that two or more kinds of the lithium sources may be used in combination, or two or more kinds of the lithium sources and two or more kinds of the vanadium sources may be used in combination.

As the reducing agent, for example, at least one of hydrazine ($NH_2NH_2$—$H_2O$) and hydrogen peroxide ($H_2O_2$) may be used. As the reducing agent, hydrazine is preferable. The use of hydrazine tends to drastically increase the discharge capacity and the rate characteristic of the battery as compared with the use of another reducing agent.

In the hydrothermal synthesis step, the ratio of the number of moles [P] of the phosphorus element contained in the mixture to the number of moles [V] of the vanadium element contained in the mixture, [P]/[V], is preferably adjusted to be in the range of 0.9 to 1.2 before the mixture is heated under pressure. This makes it easy to increase the discharge capacity of the battery. Note that the [P]/[V] may be adjusted by the mixing ratio between the phosphate source and the vanadium source contained in the mixture.

In the hydrothermal synthesis step, the ratio of the number of moles [Li] of the lithium element contained in the mixture to the [V], [Li]/[V], is preferably adjusted to be in the range of 0.9 to 1.2 before the mixture is heated under pressure. This makes it easy to increase the discharge capacity of the battery. Note that the [Li]/[V] may be adjusted by the mixing ratio between the lithium source and the vanadium source contained in the mixture.

In the hydrothermal synthesis step, the ratio of the total number of moles [M] of the one or more kinds of metal elements M contained in the mixture to the [V], [M]/[V], is preferably adjusted to be in the range of 0.01 to 0.15, more preferably 0.02 to 0.08, before the mixture is heated under pressure. This makes it easy to increase the discharge capacity of the battery. If the [M]/[V] is too small, the effect of this embodiment tends to be small. If the [M]/[V] is too large, the proportion of $LiVOPO_4$ occupied in the active material is small, so that the capacity of the battery tends to be small. However, even if the [M]/[V] is out of the above numerical range, the effect of the present embodiment can be obtained. Note that the [M]/[V] is approximately equal to the ratio of the total value of the number of moles of the metal element M contained in the active material to the number of moles of the vanadium element contained in the active material.

In the hydrothermal synthesis step, the hydrothermal reaction is advanced in the mixture by heating the mixture in the sealed container while applying pressure to the mixture. Thus, the active material of this embodiment mainly containing $LiVOPO_4$ is subjected to hydrothermal synthesis. In other words, in the hydrothermal synthesis step, the $LiVOPO_4$ crystal is doped with the metal element M or the metal salt or the metal oxide is separated out on the surface of the $LiVOPO_4$ crystal.

In the hydrothermal synthesis step, the mixture may be heated at approximately 100 to 200° C. under pressure. As the heating temperature of the mixture is lower, the excessive crystal growth of LiVOPO$_4$ is suppressed more easily. Therefore, in this embodiment, LiVOPO$_4$ having nanometer-level small particle diameter and having high Li diffusion capability in addition to having high crystallinity and excellent capacity density can be obtained.

If the temperature of the mixture in the hydrothermal synthesis step is too low, the generation and crystal growth of LiVOPO$_4$ do not progress sufficiently. As a result, the crystallinity of LiVOPO$_4$ deteriorates and the capacity density becomes lower, so that it becomes difficult to improve the discharge capacity of the battery. On the contrary, if the temperature of the mixture is too high, the crystal growth of LiVOPO$_4$ progresses excessively, so that the Li diffusion capability of the crystal deteriorates. For this reason, it becomes difficult to improve the discharge capacity and the rate characteristic of the battery with LiVOPO$_4$ to be obtained. Further, if the temperature of the mixture is too high, the reaction container needs to have high heat resistance, which increases the manufacturing cost for the active material. By setting the temperature of the mixture to be in the above range, these tendencies can be suppressed. However, even if the temperature of the mixture is out of the above numerical range, the active material of this embodiment can be synthesized.

In the hydrothermal synthesis step, the pressure applied to the mixture is preferably in the range of 0.2 to 1. MPa. If the pressure applied to the mixture is too low, the crystallinity of LiVOPO$_4$ to be obtained finally tends to be low, resulting in that the capacity density is low. If the pressure applied to the mixture is too high, the reaction container needs to have high pressure resistance, which increases the manufacturing cost for the active material. By setting the pressure applied to the mixture to be in the above range, these tendencies can be suppressed. However, even if the pressure applied to the mixture is out of the above range, the active material of this embodiment can be synthesized.

<Thermal Treatment Step>

In a thermal treatment step after the hydrothermal synthesis step, the active material may be heated. With the thermal treatment step, the reaction of the lithium source, the phosphate source, and the vanadium source, which did not proceed in the hydrothermal synthesis step, can be advanced or the crystal growth of LiVOPO$_4$ generated in the hydrothermal synthesis step can be promoted. As a result, the capacity density of LiVOPO$_4$ can be improved and the discharge capacity of the battery with LiVOPO$_4$ can be improved.

In the thermal treatment step, the mixture may be heated at 400 to 700° C. If the thermal treatment temperature is too low, the crystal growth of LiVOPO$_4$ does not progress sufficiently, so that the capacity density becomes low. If the temperature in the thermal treatment is too high, the growth of LiVOPO$_4$ proceeds excessively to increase the particle diameter of LiVOPO$_4$. As a result, the diffusion of lithium in the active material becomes slower, thereby reducing the capacity density of the active material. For these reasons, if the thermal treatment temperature is out of the above range, it is difficult to improve the discharge capacity and the rate characteristic of the battery.

The thermal treatment time for the mixture is preferably 3 to 20 hours. The atmosphere for the thermal treatment of the mixture is preferably a nitrogen atmosphere, an argon atmosphere, or an air atmosphere.

The mixture obtained in the hydrothermal synthesis step may be preliminarily heated at 60 to 150° C. for 1 to 30 hours before the thermal treatment step. By the preliminary thermal treatment, the mixture becomes powdery and unnecessary moisture or organic solvent is removed from the mixture. As a result, the intake of impurities into LiVOPO$_4$ in the thermal treatment step can be prevented and the particle shape can be homogenized.

(Electrode and Lithium Ion Secondary Battery)

As depicted in FIG. 1, a lithium ion secondary battery 100 according to this embodiment includes: a power generating element 30 including a plate-like negative electrode 20 and a plate-like positive electrode 10, which face each other, and a plate-like separator 18 disposed adjacent to, and between the negative electrode 20 and the positive electrode 10; an electrolytic solution containing lithium ions; a case 50 housing these in a sealed state; a negative electrode lead 62 having one end electrically connected to the negative electrode 20 and having the other end projecting out of the case; and a positive electrode lead 60 having one end electrically connected to the positive electrode 10 and having the other end projecting out of the case.

The negative electrode 20 includes a negative electrode current collector 22 and a negative electrode active material layer 24 stacked on the negative electrode current collector 22. The positive electrode 10 includes a positive electrode current collector 12 and a positive electrode active material layer 14 stacked on the positive electrode current collector 12. The separator 18 is disposed between the negative electrode active material layer 24 and the positive electrode active material layer 14.

The positive electrode active material layer 14 contains at least the active material of this embodiment and a conductive auxiliary agent. Examples of the conductive auxiliary agent include a carbon material such as carbon blacks, powder of metal such as copper, nickel, stainless steel, or iron, a mixture of the carbon material and the powder of the metal, and a conductive oxide such as ITO. The positive electrode active material layer may contain a binder for binding the active material and the conductive auxiliary agent.

For the negative electrode active material contained in the negative electrode active material layer 24, for example, a carbon material such as natural graphite, synthetic graphite, hard carbon, soft carbon, or low temperature heat-treated carbon, metal or alloy which can combine with lithium, such as Al, Si, Sn, or Si, an amorphous compound mainly including an oxide such as SiO$_x$ (1<x≤2) or SnO$_x$ (1<x≤2), lithium titanate (Li$_4$Ti$_5$O$_{12}$), or TiO$_2$ is given. The negative electrode active material may be bound by a binder.

The discharge capacity of the battery containing as the positive electrode active material, the active material obtained by the manufacturing method of this embodiment can be improved as compared with the battery with LiVOPO$_4$ not containing the above metal element.

One preferred embodiment of the method for manufacturing the active material according to the present invention has been described in detail. However, the present invention is not limited to the above embodiment.

For example, in the hydrothermal synthesis step, a carbon particle may be added to the mixture before being heated. This allows at least a part of LiVOPO$_4$ to be generated on a surface of the carbon particle and the carbon particle to carry LiVOPO$_4$. As a result, the electric conductivity of the active material to be obtained can be improved. As the material of the carbon particle, carbon black (graphite) such as Ketjen black or acetylene black, activated carbon, hard carbon, soft carbon, or the like can be used.

The active material of the present invention can be used as an electrode material for an electrochemical element other than the lithium ion secondary battery. Examples of such an electrochemical element include a secondary battery other than the lithium ion secondary battery such as a metal lithium secondary battery (battery using the electrode containing the active material obtained by the present invention as a cathode and metal lithium as an anode), and an electrochemical capacitor such as a lithium capacitor. These electrochemical elements can be used for a power source in self-running micromachines, IC cards, or the like or for a dispersed power source arranged on a printed board or in a printed board.

EXAMPLES

Hereinafter, the present invention is described in more detail with reference to Examples and Comparative Examples. However, the present invention is not limited to the examples below.

Example 1

In the manufacture of an active material of Example 1, a mixture solution containing the following raw materials was prepared.

Lithium source: 8.48 g (0.20 mol) of $LiOH-H_2O$ (molecular weight=41.96, manufactured by Nacalai tesque, super-high grade, purity of 99 wt %)

Phosphate source: 23.07 g (0.20 mol) of $H_3PO_4$ (molecular weight=98.00, manufactured by Nacalai tesque, 1st grade, purity of 85 wt %)

Vanadium source: 18.37 g (0.10 mol) of $V_2O_5$ (molecular weight=181.88, manufactured by Nacalai tesque, super-high grade, purity of 99 wt %)

Compound of metal element M: 1.32 g (0.005 mol) of $Nb_2O_5$ (molecular weight=265.81, manufactured by Nacalai tesque)

Distilled water for 200 g (manufactured by Nacalai tesque, for HPLC (high-speed liquid chromatography))

Another 20 g of distilled water was used between the glass container and the autoclave.

Reducing agent: 2.55 g (0.05 mol) of $NH_2NH_2-H_2O$ (molecular weight=50.06, manufactured by Nacalai tesque, super-high grade, purity of 98 wt %)

As is clear from each content of the lithium source, the phosphate source, and the vanadium source, the starting amounts of the raw materials stoichiometrically correspond to the yield of approximately 33.78 g (0.2 mol) of $LiVOPO_4$ (molecular weight: 168.85).

The above mixture solution was prepared according to the following procedure. First, the above $H_3PO_4$ and distilled water were poured into an inner cylinder of an autoclave of 500 mL content. These were stirred with a magnetic stirrer. Then, the above $V_2O_5$ was added to the inner cylinder of the autoclave and then the solution was stirred continuously for approximately 2.5 hours. Then, a yellow-orange liquid phase (suspension) was obtained in a flask. While the liquid phase was stirred with the magnetic stirrer, the above hydrazine monohydrate ($NH_2NH_2-H_2O$) was dropped into the liquid phase. By the drop of the hydrazine monohydrate, the liquid phase turned from the yellow orange into dark green. Subsequently, the above $LiOH-H2O$ was added to the liquid phase. Next, the above $Nb_2O_5$ was added to the liquid phase. Thus, the above mixture solution was obtained.

The inner cylinder of the autoclave containing the mixture solution was sealed. While the mixture solution was stirred with a strong magnetic stirrer, the thermal treatment of the mixture solution was started by predetermined PID control. The inner pressure of the sealed glass container was increased along with the thermal treatment. In this hydrothermal synthesis step, the mixture solution in the glass container was heated under pressure for 16 hours. In the hydrothermal synthesis step, the temperature in the glass container was maintained at 160° C. The pressure in the glass container was maintained at 0.6 MPa.

After the thermal treatment was stopped and the temperature in the inner cylinder of the autoclave was lowered to 40° C., the mixture solution was removed from the inner cylinder of the autoclave. Note that it took approximately four hours to decrease the temperature in the inner cylinder of the autoclave to 40° C. after the stop of the thermal treatment. The mixture solution removed from the inner cylinder of the autoclave was light-blue paste. The pH of the light-blue paste measured with pH test paper was 7. The light-blue paste was dried at 90° C. for 24 hours, thereby providing 39.55 g of light-green solid. The drying was performed using an oven. A step of pulverizing the light-green solid with a coffee mill for 30 seconds and a subsequent step of stopping the pulverizing for 30 seconds are alternately repeated 10 times.

Into an alumina crucible, 3.00 g of the pulverized green solid was input. A thermal treatment step of heating the solid in the alumina crucible was performed using a heating furnace. In the thermal treatment step, the solid in the alumina crucible was heated in the air atmosphere. Moreover, in the thermal treatment step, the temperature in the furnace was increased from room temperature to 450° C. in 45 minutes, and after the solid in the alumina crucible was heated at 450° C. for 4 hours, the heating furnace was cooled naturally. Through this thermal treatment step, 2.700 g of yellow-green powder was obtained as the active material of Example 1. The residual ratio of the solid after the thermal treatment step was 90%.

Example 2

In Example 2, the following particulate Al was used alone instead of $Nb_2O_5$: 0.27 g (0.01 mol) of Al (atomic weight: 26.9895, manufactured by Kojundo Chemical Lab. Co., Ltd., purity: 99.9 wt %, mean diameter: approximately 3 μm).

After the addition of $LiOH-H_2O$ (before the addition of the Al particle), the liquid phase had a pH of 7.

An active material of Example 2 was manufactured by the method similar to that of Example 1 except for the above matter.

Examples 3 to 10

In Examples 3 to 10, a compound of the metal element M shown in Table 1 was used as the raw material instead of $Nb_2O_5$. In Examples 3 to 10, by adjusting the amount of adding the compound of the metal element M, 100×[M]/[V] (unit: %) was set to the value shown in Table 1. Here, [M] represents the number of moles of the metal element M contained in the mixture solution and [V] represents the number of moles of the vanadium element contained in the mixture solution. Each active material of Examples 3 to 10 was obtained by a method similar to that of Example 1 except for the above matter.

Comparative Example 1

An active material of Comparative Example 1 was manufactured by a method similar to that of Example 1 except that $Nb_2O_5$ was not used as the raw material.

[Analysis of Active Material]

From results of analysis by powder X-ray diffraction (XRD), it was confirmed that the active materials of all the Examples and Comparative Example 1 contained $LiVOPO_4$. As a result of analyzing with TEM (transmission electron microscope) and EDX (energy dispersive X-ray spectrometry), it was confirmed that the $LiVOPO_4$ crystal particle in the active material of each example contained each metal element M shown in Table 1. Further, it was confirmed that the compound of each metal element M shown in Table 1 was separated out on a surface of the $LiVOPO_4$ crystal contained in the active material of each example.

[Manufacture of Evaluation Cell]

The active material of Example 1, polyvinylidene fluoride (PVDF) as a binder, and acetylene black were mixed and dispersed in N-methyl-2-pyrrolidone (NMP) as a solvent, thereby preparing slurry. Note that the slurry was adjusted so that the weight ratio among the active material, acetylene black, and PVDF is 84:8:8 in the shirty. This slurry was applied on an aluminum foil as the current collector, dried, and rolled, thereby providing an electrode (positive electrode) provided with the active material layer containing the active material of Example 1.

The obtained electrode and a Li foil as a counter electrode thereof were stacked with a separator including a polyethylene microporous film interposed therebetween, thereby providing a multilayer body (element). This multilayer body was put into an aluminum laminate package. Into this aluminum laminate package, 1 M of $LiPF_6$ solution as the electrolytic solution was injected and the package was sealed to vacuum, thereby manufacturing an evaluation cell of Example 1.

By a method similar to that of Example 1, the evaluation cells were manufactured each including each active material of Examples 2 to 10 and Comparative Example 1 alone.

[Measurement of Discharge Capacity]

Using the evaluation cell of Example 1, the discharge capacity (unit: mAh/g) in the case where the discharging rate was 2 C (current value at which, when the constant-current discharging is performed at 25° C., the discharging ends in 0.5 hours) was measured. The measurement results are shown in Table 1.

By a method similar to that of Example 1, the discharge capacity of each evaluation cell of Examples 2 to 10 and Comparative Example I was measured. The results are shown in Table 1.

[Table 1]

TABLE 1

| | Metal Element M | Compound of M | 100 × [M]/[V] (%) | Discharge Capacity (mAh/g) |
|---|---|---|---|---|
| Example 1 | Nb | $Nb_2O_5$ | 5 | 67 |
| Example 2 | Al | Al alone | 10 | 59 |
| Example 3 | Mg | MgO | 5 | 63 |
| Example 4 | Mg | MgO | 0.01 | 51 |
| Example 4 | Na | NaOH | 5 | 55 |
| Example 5 | K | KOH | 5 | 53 |
| Example 6 | Mn | $MnO_2$ | 5 | 61 |
| Example 7 | Fe | $FeSO_4$ | 5 | 65 |
| Example 8 | Si | $SiO_2$ | 5 | 58 |
| Example 9 | Si | $SiO_2$ | 0.01 | 49 |
| Example 10 | Si | $SiO_2$ | 0.003 | 40 |
| Comparative Example 1 | None | None | 0 | 38 |

DESCRIPTION OF REFERENCE SIGNS

10 positive electrode
20 negative electrode
12 positive electrode current collector
14 positive electrode active material layer
18 separator
22 negative electrode current collector
24 negative electrode active material layer
30 power generating element
50 case
60, 62 lead
100 lithium ion secondary battery

The invention claimed is:

1. An active material comprising:
$LiVOPO_4$ crystal particles containing within the particles and on surfaces of the particle one or more elements M selected from the group consisting of Al, Nb, Mg, Na, K, and Si, wherein
the metal element is present as a metal salt or a metal oxide.

2. An electrode comprising:
a current collector; and
an active material layer stacked on the current collector, wherein the active material layer contains the active material according to claim 1 and a conductive auxiliary agent.

3. A lithium ion secondary battery comprising the electrode according to claim 2.

4. The active material according to claim 1, wherein a ratio of M moles to V moles contained in the active material is approximately in the range of 0.01 to 0.15.

5. The active material according to claim 4, wherein the range is 0.02 to 0.08.

6. The active material according to claim 1, obtained by a process including a hydrothermal synthesis step of heating a mixture at a temperature of approximately 100 to 200° C. under pressure, the mixture including: one or more elements M selected from the group consisting of Al, Nb, Mg, Na, K, and Si; a lithium source; a phosphate source; a vanadium source; and water.

7. The active material according to claim 6, wherein in the hydrothermal synthesis step, the ratio of the total number of moles of M contained in the mixture to the number of moles of V is adjusted to be in the range of 0.01 to 0.15, and wherein the ratio is approximately equal to the ratio of M moles to V moles contained in the active material.

8. The active material according to claim 7, wherein the range is 0.02 to 0.08.

9. The active material according to claim 6, wherein a thermal treatment step is carried out after the hydrothermal synthesis step in which the mixture is heated at 400 to 700° C.

10. The active material according to claim 1, wherein the metal element is present as a metal salt selected from the group consisting of a hydroxide, a carbonate, a sulfate, a chloride, and a phosphide.

11. The active material according to claim 1, wherein the metal element is present as a metal oxide selected from the group consisting of NaOH, KOH, $Al_2O_3$, $Nb_2O_5$, MgO, and $SiO_2$.

12. The active material according to claim 1, wherein M comprises Al.

13. The active material according to claim 1, wherein M comprises Nb.

14. The active material according to claim 1, wherein M comprises Mg.

15. The active material according to claim 1, wherein M comprises Na.

16. The active material according to claim 1, wherein M comprises K.

17. The active material according to claim 1, wherein M comprises Si.

* * * * *